United States Patent
Boehm et al.

(10) Patent No.: US 9,684,493 B2
(45) Date of Patent: Jun. 20, 2017

(54) R-LANGUAGE INTEGRATION WITH A DECLARATIVE MACHINE LEARNING LANGUAGE

(71) Applicant: International Business Machines Corporation, Armonk, NY (US)

(72) Inventors: Matthias Boehm, San Jose, CA (US); Douglas R. Burdick, Scotts Valley, CA (US); Stefan Burnicki, Stuttgart (DE); Berthold Reinwald, San Jose, CA (US); Shirish Tatikonda, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/293,223

(22) Filed: Jun. 2, 2014

(65) Prior Publication Data
US 2015/0347101 A1    Dec. 3, 2015

(51) Int. Cl.
    *G06F 9/44*    (2006.01)
    *G06F 9/45*    (2006.01)

(52) U.S. Cl.
    CPC ................................... *G06F 8/41* (2013.01)

(58) Field of Classification Search
    None
    See application file for complete search history.

(56) References Cited

U.S. PATENT DOCUMENTS

| 8,612,368 | B2 | 12/2013 | Burdick et al. |
| 2011/0191361 | A1 | 8/2011 | Gupta et al. |
| 2011/0302583 | A1 | 12/2011 | Abadi et al. |
| 2012/0182891 | A1 | 7/2012 | Lee et al. |
| 2012/0226639 | A1 | 9/2012 | Burdick et al. |
| 2012/0278578 | A1 | 11/2012 | Castillo et al. |
| 2012/0297145 | A1 | 11/2012 | Castillo et al. |
| 2013/0097593 | A1 | 4/2013 | Ravi et al. |
| 2013/0262520 | A1* | 10/2013 | Mukhin .............. G06F 17/3056 707/802 |
| 2014/0019443 | A1* | 1/2014 | Golshan ............ G06F 17/30867 707/723 |

OTHER PUBLICATIONS

Vinayak Borkar, et al.; "Declarative Systems for Large-Scale Machine Learning"; Bulletin of the IEEE Computer Society Technical Committee on Data Engineering; Copyright 2012 IEEE.
Sudipto Das, et al.; "Ricardo: Integrating R and Hadoop"; SIGMOD '10; Jun. 6-11, 2010; Indianapolis, Indiana; Copyright 2010; ACM978-1-4503-0032-2/10/06.

(Continued)

*Primary Examiner* — Chuck Kendall
(74) *Attorney, Agent, or Firm* — Edward J. Wixted, III (57) ABSTRACT

In a method for analyzing a large data set using a statistical computing environment language operation, a processor generates code from the statistical computing environment language operation that can be understood by a software system for processing machine learning algorithms in a MapReduce environment. A processor transfers the code to the software system for processing machine learning algorithms in a MapReduce environment. A processor invokes execution of the code with the software system for processing machine learning algorithms in a MapReduce environment.

17 Claims, 4 Drawing Sheets

(56) References Cited

OTHER PUBLICATIONS

Jeffrey Dean et al., "MapReduce: Simplified Data Processing on Large Clusters", USENIX Association OSDI '04: 6th Symposium on Operating Systems Design and Implementation, pp. 137-149.
Herodoto Herodotou et al., "Profiling, What-if Analysis, and Cost-based Optimization of MapReduce Programs", Proceedings of the VLDB Endowment, vol. 4, No. 11 Copyright 2011 VLDB Endowment 2150-8097/11/08.

* cited by examiner

R-LANGUAGE INTEGRATION WITH A DECLARATIVE MACHINE LEARNING LANGUAGE

BACKGROUND

The present invention relates generally to efficient techniques for the analysis of large data sets, and more particularly to a technique that enables programs written in the R-language to support efficient operations on large data sets and large computations.

The R-language (R) is a statistical computing environment. R includes a variety of statistical and graphical capabilities that may be applied to arrays of data, e.g., scalars, vectors, matrices, tables and other data structures. R-language programs commonly perform statistical analysis on sets of data that are regular in nature and fit into or can be paged into the main memory of a computer where the data is operated on. R is designed to run in the main memory of one single computer in a single thread of execution. R is easily extensible and enables code written in other programming languages to be packaged into an R program.

MapReduce is a distributed data processing model that provides for the partition and distribution of computation and data over large clusters of servers, and enables a computation expressed as a MapReduce job to be executed in parallel on a plurality of computers. One example of a system that performs MapReduce computations is Hadoop®. Hadoop® is an open-source system that runs MapReduce jobs on clusters of computers that access a Hadoop® distributed file system (HDFS), a distributed file system that runs on large clusters of commodity machines.

SystemML compiles and automatically parallelizes machine learning (ML) algorithms which are written in declarative machine learning language (DML), a high level language oriented to ML tasks. SystemML produces sets of MapReduce jobs that can execute on Hadoop®.

SUMMARY

Embodiments in accordance with the present invention disclose a method, computer program product, and computer system for analyzing a large data set using a statistical computing environment language operation. A processor generates code from the statistical computing environment language operation that can be understood by a software system for processing machine learning algorithms in a MapReduce environment. A processor transfers the code to the software system for processing machine learning algorithms in a MapReduce environment. A processor invokes execution of the code with the software system for processing machine learning algorithms in a MapReduce environment.

DETAILED DESCRIPTION

Data sets continually grow in size and the larger ones vastly exceed a size of a computer's main memory, so it is desirable to find ways to scale the capability of an R program to perform large calculations and operate on large datasets and sometimes on massive data sets (e.g., climate, weather and social media related data sets), without unduly burdening an R programmer. Currently, if an R-programmer desires the efficiencies and capabilities of employing R to analyze "big data" by using the MapReduce capabilities of a system such as Hadoop®, the R-programmer must hand code a MapReduce program specifically for the R program. A new MapReduce program may have to be hand coded when the analysis the programmer is expressing in R is slightly altered or when data characteristics change. Therefore, a technique that enables an R-programmer to have an analysis (a program) that is expressed in R be automatically transformed into one or more MapReduce jobs capable of running on a system such as Hadoop® is highly desirable. Functions that SystemML provides for DML are highly desirable for the R-language so that the R-language may also analyze large data sets and perform large calculations with MapReduce jobs running on Hadoop®.

The present invention will now be described in detail with reference to the Figures.

Figure 1:
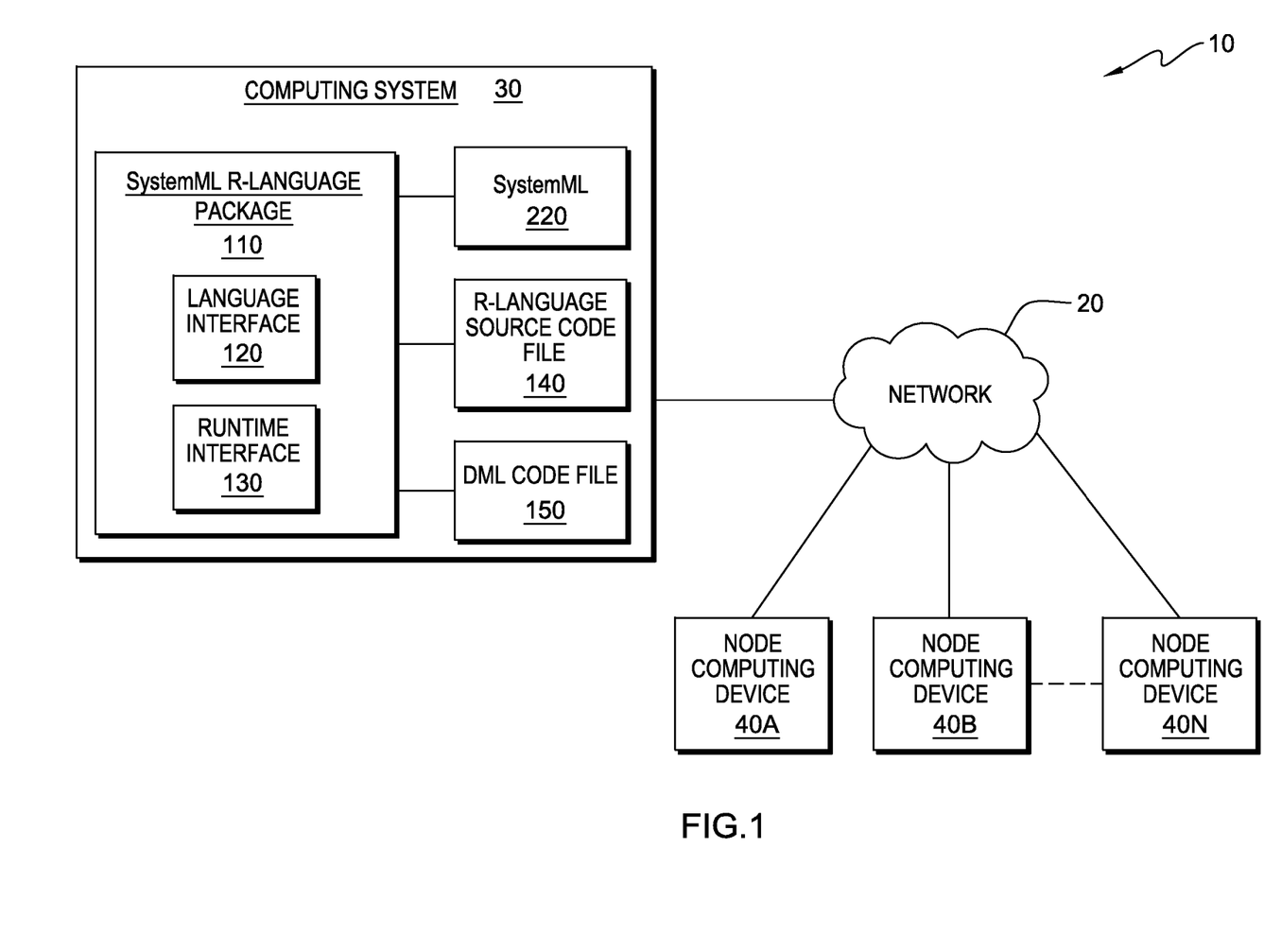
FIG. 1 depicts a diagram of a system in accordance with one embodiment of the present invention.

FIG. 1 depicts a diagram of system 10 in accordance with one embodiment of the present invention. FIG. 1 provides only an illustration of one embodiment and does not imply any limitations with regard to the environments in which different embodiments may be implemented.

In the depicted embodiment, system 10 includes computing system 30 and node computing devices 40A-40N interconnected over network 20. Network 20 may be a local area network (LAN), a wide area network (WAN) such as the Internet, any combination thereof, or any combination of connections and protocols that will support communications between computing system 30 and node computing devices 40A-40N in accordance with embodiments of the invention. Network 20 may include wired, wireless, or fiber optic connections. System 10 may include additional computing devices, servers, computers, or other devices not shown.

Computing system 30 may be a management server, a web server, or any other electronic device or computing system capable of receiving and sending data. In some embodiments, computing system 30 may be a laptop computer, tablet computer, netbook computer, personal computer (PC), a desktop computer, a personal digital assistant (PDA), a smart phone, or any programmable electronic device capable of communicating with node computing devices 40A-40N via network 20. In other embodiments, computing system 30 may represent a server computing system utilizing multiple computers as a server system, such as in a cloud computing environment. Computing system 30 contains R-language source code file 140, DML code file 150, SystemML R-language package 110, language interface 120, runtime interface 130, and SystemML 220.

SystemML 220 is a system for scalable machine learning with R-like syntax that can compile and execute algorithms expressed in declarative machine learning language (DML) in a MapReduce environment. MapReduce is a programming model for processing large data sets and for performing large calculations with a parallel, distributed algorithm on a cluster. A cluster is a set of computers that work together. A popular open-source implementation of MapReduce is Apache™ Hadoop®. SystemML 220 may implement optimization techniques to generate low-level execution plans for MapReduce. The optimizations are based on system and data characteristics. To run an algorithm, SystemML 220 passes different phases, each breaking down the code into lower level operators, and finally produces an execution plan comprising of zero or more MapReduce jobs. If no MapReduce jobs are generated, such as when the DML code has only scalar operations and no matrix operations, SystemML 220 may compile and execute the algorithms. If generated, MapReduce jobs read/write data from/to HDFS 230 (see FIG. 2), which is a distributed file system which is especially designed for storing huge amounts of data. In one embodiment, SystemML 220 resides on computing system 30. In other embodiments, SystemML 220 may reside on another server, another computing device, or another computing system, provided that SystemML 220 has access to DML code file 150, and/or provided that SystemML 220 is accessible to SystemML R-language package 110 and/or DML code file 150.

Figure 2:
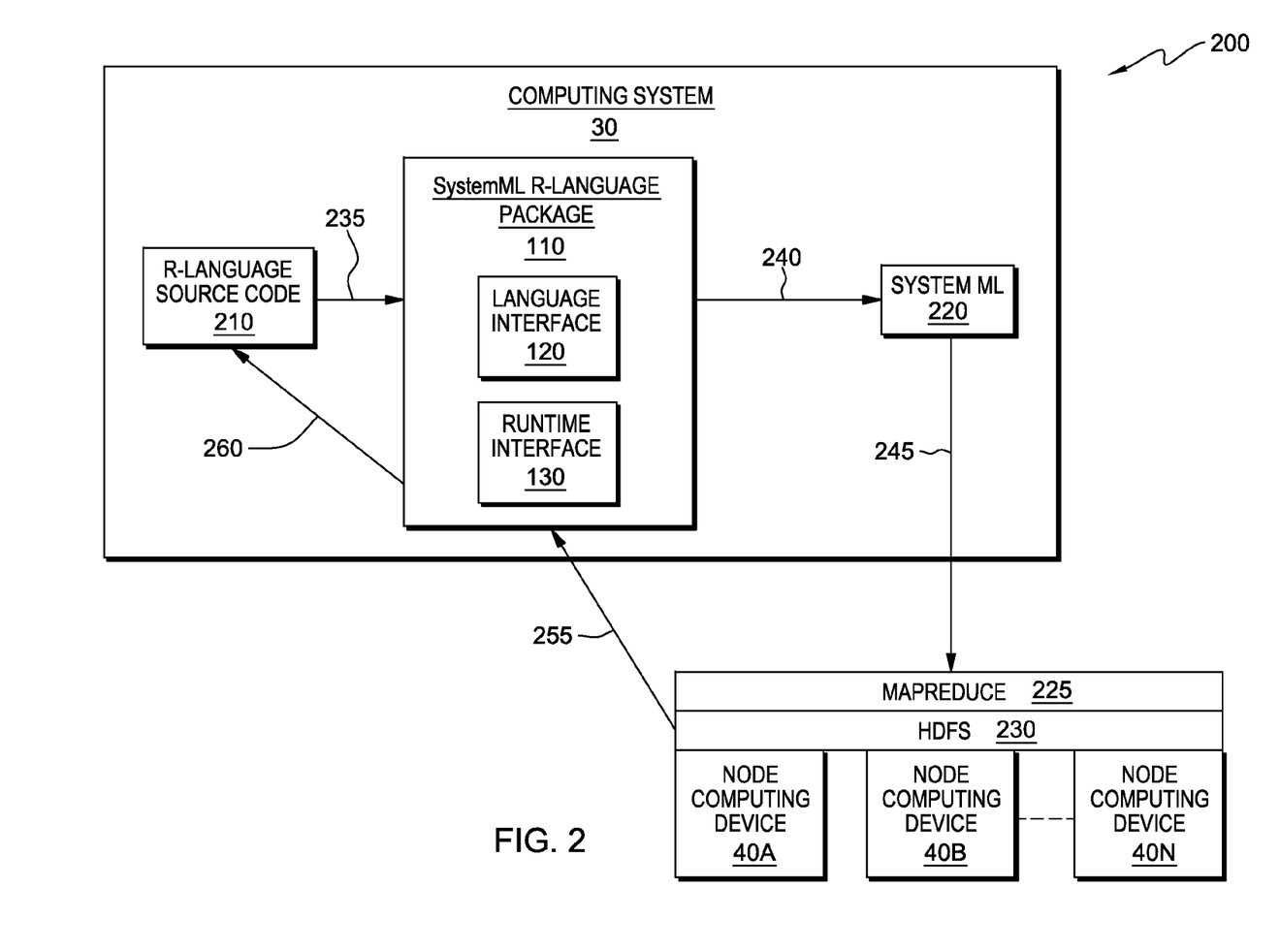
FIG. 2 depicts a use-case scenario in accordance with one embodiment of the present invention.

Computing system 30 may also contain a Hadoop® Distributed File System (HDFS), such as HDFS 230, and be capable of executing R-language source code, such as R-language source code 210 (see FIG. 2). R is a language and environment for statistical computing and graphics. R may be extensible through the use of packages.

R-language source code file 140 may be a file with R-language source code, such as R-language source code 210 (see FIG. 2). R-language source code file 140 may be written and read by SystemML R-language package 110. In one embodiment, R-language source code file 140 resides on computing system 30. In other embodiments, R-language source code file 140 may reside on another server, another computing device, or another computing system, provided that R-language source code file 140 is accessible to SystemML R-language package 110.

DML code file 150 may be a file with DML code, such as DML code generated by SystemML R-language package 110. DML code file 150 may be written and read by SystemML R-language package 110 and SystemML 220. In one embodiment, DML code file 150 resides on computing system 30. In other embodiments, DML code file 150 may reside on another server, another computing device, or another computing system, provided that DML code file 150 is accessible to SystemML R-language package 110 and SystemML 220.

SystemML R-language package 110 is an R-language package that extends the capabilities of R. A package may be a collection of R scripts or native R code that is installed on a computer and can be loaded by R. For example, a package can be loaded by R with the library command. A package can take advantage of every feature of the R-language and environment, such as the possibility to write new functions, define new classes, and overload existing functions to be used with other data types. System ML R-language package 110 integrates the execution of DML code into the R environment, enabling the ability to analyze large data sets and perform large calculations using machine learning algorithms implemented in DML. Language interface 120 is responsible for the integration on the language level. Language interface 120 operates on a syntactic level and is responsible for catching R operations and function calls to pass them to runtime interface 130. Runtime interface 130 is, in general, independent from the R-language. Runtime interface 130 affects data transfer, and the execution of operations in SystemML 220. In one embodiment, SystemML R-language package 110 resides on computing system 30. In other embodiments, SystemML R-language package 110 may reside on another server, another computing device, or another computing system, provided that SystemML R-language package 110 has access to R-language source code file 140 and SystemML 220.

Language interface 120 is responsible for the integration of DML in the R-environment at the language level. Language interface 120 operates on a syntactic level and is responsible for catching R operations and function calls to pass them to runtime interface 130. In order to differentiate operations that will be executed in the R environment from those that will be executed with SystemML 220, some embodiments may use a new class (hereinafter referred to as systemmldata) introduced by language interface 120. Systemmldata is a class that refers to any kind of data intended to be processed or returned by SystemML 220. In the depicted embodiment, functions and operators within the R environment can be overloaded such that they are executed with SystemML 220 if the function or operator is invoked with an argument of the class systemmldata. Because regular R functions cannot be used with the new class systemmldata, language interface 120 may employ coercing.

Coercing is R's concept of converting one data type to another. Common coercing functions include "as.numeric," "as.matrix," "as.character," etc. These coercing functions convert their argument to the corresponding R data type. Language interface 120 may overload these functions for every new data type, such that, in the depicted embodiment, a user may use the functions to convert systemmldata objects into R data types. In some embodiments, to convert R data types into systemmldata objects, language interface 120 introduces a new coercing function (hereinafter referred to as "as.systemmldata") which integrates with R's coercing mechanisms. Many functions, such as arithmetic operators, expect more than one parameter. In some embodiments, it is possible to introduce implicit conversion of data types. Language interface 120 may introduce overloaded functions that determine, when one of the passed arguments is a systemmldata object, to either convert the systemmldata object into an R data type and call an R function, or to convert all of the other arguments into systemmldata objects to be executed with SystemML 220. The actual conversion of data and execution is discussed below with reference to runtime interface 130.

User-defined infix operators are operators that can be defined by packages, such as SystemML R-language package 110, and used like a usual arithmetic infix operator. User-defined infix operators are functions that begin and end with "%" and take two arguments. For example, in the R language the infix operator "%*%" is often used for matrix multiplication. The R language allows a function to not only get data as an argument, but also unevaluated R code. Embodiments of language interface 120 may define new infix operators that take an arbitrary keyword as the first argument and any R code as the second argument. Such an operator (hereinafter referred to as "% iter %") allows language interface 120 to preserve, to an extent, native R code, but be able to analyze and modify it without being forced to execute the R code. In the example below, language interface 120 has introduced an operator, "% iter %," that is able to access the complete code of the loop without being forced to execute it.

```
1 SystemML %iter% while (condition) {
2 ...
3 }
```

DML allows the use of functions that are defined in other scripts by importing them. It is possible to either import a complete script with all its functions or only selected functions. If a complete script is imported to DML, the functions of the script will be available in a new namespace. A namespace is a prefix which allows functions of the same name to be distinguished from one another. For example, two "add" functions can be distinguished by the namespaces "x" and "y," e.g., "x.add" and "y.add." If only selected functions of a script are imported, they will not be accessible in a separate namespace, but can be used from the global namespace, i.e., without any prefix. In some embodiments of the present invention, it is possible to use existing DML functions from an R script. In one embodiment, language interface 120 may accomplish this by extending R's import and namespace mechanisms.

In another embodiment, language interface 120 may use DML functions from an R script by defining a new mechanism only for DML functions. In such an embodiment, language interface 120 may introduce a new class in R (hereinafter referred to as systemmlns) which represents a namespace in DML. A single systemmlns object may be used to represent DML's global namespace (hereinafter referred to as "SystemML"). The operator "$" is usually used to access member variables of lists and objects within the R language. In some embodiments, "$" may be overloaded to access functions in the "SystemML" namespace. With such an implementation, the complete namespace mechanism of DML can be used from within the R environment without commingling with R's own namespace mechanism.

As previously mentioned, language interface 120 catches R operations and function calls and passes them to runtime interface 130. Runtime interface 130 affects data transfer and the execution of operations in SystemML 220. In embodiments of the present invention, runtime interface 130 is accessed by language interface 120, and is not directly accessed from the user's script. In some embodiments, runtime interface 130 may be independent from the R environment.

In some embodiments, runtime interface 130 is written in Java. Java is the native language of SystemML 220 and Hadoop®. In such embodiments, an R-language package may be used to allow the use of components, written in Java, from R. An open-source package that allows such functionality is rJava. rJava provides a low-level bridge between R and Java and allows for the creation of objects, call methods, and access fields of Java objects from R. Such a package allows language interface 120 to access runtime interface 130.

Once language interface 120 passes R data to runtime interface 130, the data is converted from R data types to DML data types. In one embodiment, SystemML 220 and runtime interface 130 communicate using sockets, wherein data is transferred using an appropriate protocol and incoming data is extracted from the received message. Such an approach would require an appropriate protocol and socket communication being implemented in both SystemML 220 and runtime interface 130. In another embodiment, runtime interface 130 and SystemML 220 may use the same data structures and use shared common memory to save the data. In yet another embodiment, the file transfer from runtime interface 130 to SystemML 220 may be realized by using files as a transfer mechanism. In such an embodiment, one component may write the data to a file, such as DML code file 150, and copy it to the destination location where the other component may read it. Existing file formats that SystemML 220 supports may be used in this approach. To avoid data transfer via files for scalar types from runtime interface 130 to SystemML 220, scalar types are transferred as DML literals, which is equivalent to if a user had written a scalar type directly in a script, rather than using a computed result.

Embodiments of the present invention that operate via file transfer from runtime interface 130 to SystemML 220 may utilize a shared library between language interface 120 and runtime interface 130. The shared library may be provided with functions written in C. C functions have direct access to the memory of the R environment, such that they can read from and write to the R environment without intermediate copying or interpreting. In such an embodiment, language interface 120 may use the shared library to read and write data to file and pass the filename pointer, rather than the file, to runtime interface 130. Passing only the filename may increase efficiency by bypassing data transfer across the R-language package that allows for the use of components written in Java from R.

In some embodiments, efficiency is enhanced by lazy evaluation. Lazy evaluation is an evaluation strategy which delays the evaluation of an expression until its value is needed, and which avoids repeated evaluation. Embodiments of the present invention may achieve lazy evaluation by batching, or arranging, operations first, and then executing them once the result of an operation is needed. In some embodiments, the batching is implemented by the creation of a directed acyclic graph (DAG) by runtime interface 130. A DAG describes the inputs and outputs of each of the arithmetic operations performed within code. A DAG representation allows a compiler to perform common subexpression elimination more efficiently. Common subexpression elimination is a compiler optimization that searches for instances of identical expressions, and analyzes whether it is worthwhile to replace them with a single variable holding the computed value. For example, if a particular calculation is going to be performed multiple times, it may be worthwhile to store the results of the calculation for retrieval, rather than recalculating each time the particular calculation is required.

In embodiments of the present invention, if a function of language interface 120 gets called from R, the operation should be executed by SystemML 220. Language interface 120 may communicate to runtime interface 130 that there is a new operation to be registered. This operation may be represented as a new node in the DAG. Runtime interface 130 may assign each node in the DAG a reference, and return that reference to language interface 120. Language interface 120 may store each reference in a new systemmldata object and return the object(s) as the result of the operation to the R environment. As such, if a following operation refers to the result, language interface 120 will pass the references to the first operation in the DAG, rather than the data as an argument. In some embodiments, runtime interface 130 will hash received expressions. Runtime interface 130 may create a hash code that may depend on the operation it represents, as well as the node upon which the hash code references on the DAG. As such, the hash code will be unique for each given operation. Runtime interface 130 may store the hash code with a reference to the corresponding expression of the DAG. By hashing received expressions, runtime interface 130 may determine that an operation occurs twice or more during the creation of a DAG and return the existing expression of the DAG, instead of creating a new set of nodes, thereby avoiding repeated execution of the same expression.

Generally, embodiments of runtime interface 130 should execute the DAG when an R operation needs the resulting data to perform the operation, or when the result of an operation should be written to a file. For example, during data conversion, overloaded functions of language interface 120 may be called and language interface 120 can tell runtime interface 130 to return the data that belongs to the given systemmldata object. At such a time, runtime interface 130 can trigger the execution of the partial DAG referenced by this object. In some embodiments there may be a function (hereinafter referred to as "writeHDFS") defined by language interface 120 which represents DML's "write" function. If "writeHDFS" is called, language interface 120 may notify runtime interface 130 this part of the DAG must be executed after the "write" operation is added.

In some embodiments, after sections of the DAG are executed in SystemML 220, runtime interface 130 may reduce the DAG. Runtime interface 130 may reduce the DAG when there is no need to know which operations lead to the result after execution. In such a situation, runtime interface 130 may remove the executed section of the DAG and replace it with a single "result expression." Reducing the DAG in such a way can free up memory within computing system 30. In addition to removing the executed section of the DAG, references to the node should be removed. In some embodiments a wrapper class may be created that owns the existing reference to the node object, and the reference to the wrapper object will be deployed to the R environment, parent nodes, and a map that prevents the creation of redundant nodes.

SystemML 220 is implemented to work stateless, such that one execution is completely independent from any other execution that might have taken place before. As such, intermediate results, or results that might be used by multiple executions, may be recomputed in future executions. In some embodiments, runtime interface 130 may save the results of all intermediate results, which are also assigned variables in the R environment, as these are the only intermediate results that are qualified for being used in multiple executions. Because there are many ways in R to assign variables, it is not possible to overload and track assignments by language interface 120. However, R provides the function "match.call( )," which can be used inside of user-defined or overloaded functions to determine how the function was called from a syntactical view. This method can be used for functions defined in within language interface 120 to find out how arguments were passed. In some embodiments, if an argument of an operation is a systemmldata object and was passed by a variable, language interface 120 may cause runtime interface 130 to tag the referenced node of the DAG, such that runtime interface 130 will save the result of the referenced node upon evaluation.

Control flow structures within R that contain loops can result in runtime interface 130 creating a very large DAG, which could increase the time to compile and optimize the DAG. Some embodiments of the present invention may use the user-defined infix operator "% iter %," as discussed above, to cause language interface 120 to force iterative execution of the loops, creating a series of small DAGs in runtime interface 130. In such an embodiment, runtime interface 130 may be notified that a loop will be executed. Runtime interface 130 will then increase an internal variable (hereinafter referred to as loopLevel), which represents the number of loops that have executed. In such an embodiment, runtime interface 130 will create a list including each node and the current loopLevel associated with the node. As the last statement of the loop, within language interface 120, a call to runtime interface 130 may be inserted. Runtime interface 130 may then iterate over the internal list and execute nodes that are associated with the current loopLevel. After a node is executed, runtime interface 130 may remove the node from the list. After the loop has finished, runtime interface 130 may be invoked to decrease the current loopLevel, and once the loopLevel is 0, runtime interface 130 will stop adding new nodes to the internal list, and pass the loop back to R to be executed.

In one embodiment, runtime interface 130 may communicate with SystemML 220 by generating a DML script of the DAG and passing the DML script to SystemML 220. In such an embodiment, runtime interface 130 would cause each node to generate the operation it represents and trigger the DML generation of all nodes it references. In another embodiment, SystemML 220 could be changed to accept DAGs, and runtime interface 130 could use existing DAG structures of SystemML 220 and directly pass the generated DAG.

In order to generate DML code from the DAG, in some embodiments, runtime interface 130 may allocate a stringlist (herein referred to as codestack) that will be passed to the triggered node of the DAG, which will hand it down, recursively, to all child-nodes, each generating one line of DML code. In such an embodiment, each node will first pass codestack to all child nodes, and the child nodes will return a variable name, which can be used for DML generation of the current node. After the initially triggered node returns, codestack will include all DML operations that are needed to compute the desire result. Runtime interface 130 may then add further statements based on import statements for all imports registered by language interface 120, read statements for all used results of previous executions and data that comes from file input, and write statements for all intermediate results that should be saved for upcoming executions. This may create a codestack that contains a complete DML script which uses data input, processes the data input, and saves the output to file to be executed by SystemML 220.

In one embodiment, SystemML 220 can be invoked by starting a new process and passing the generated DML script as an argument. In another embodiment, SystemML 220 can be invoked by invoking SystemML 220's main class directly via a shared Java virtual machine (JVM). A JVM is a virtual machine that can execute Java.

Node computing devices 40A-40N may each be management servers, web servers, or any other electronic devices or computing systems capable of receiving and sending data. In some embodiments, node computing devices 40A-40N may be laptop computers, tablet computers, netbook computers, personal computers (PCs), desktop computers, personal digital assistants (PDAs), smart phones, or any programmable electronic devices capable of communicating with computing system 30 via network 20. In other embodiments, node computing devices 40A-40N may represent server computing systems utilizing multiple computers as a server system, such as in a cloud computing environment. While the depicted embodiment shows node computing device 40A, node computing device 40B, and node computing device 40N, it should be recognized that node computing devices 40A-40N may include any number of node computing devices, including more or less node computing devices than are depicted. Node computing devices 40A-40N may include components, as depicted and described in further detail with respect to FIG. 4.

FIG. 2 depicts use-case scenario 200 of system 10 in accordance with one embodiment of the present invention. Use-case scenario 200 depicts computing system 30 interconnected with node computing devices 40A-40N. In use-case scenario 200, network 20 (see FIG. 1) has been removed to enhance clarity when discussing communications between computing system 30 and node computing devices 40A-40N.

Use-case scenario 200 depicts a selection of R-language source code, more specifically R-language source code 210, having operations translated by SystemML R-language package 110 into declarative machine learning language (DML) such that SystemML 220 can determine if MapReduce jobs should be created to compute the operation, and if so, MapReduce jobs shall be created, and results returned such that they may be understood by the R-language.

In scenario 200, R-language source code 210 is source code that has been written and includes loading SystemML R-language package 110. For example, R-language source code 210 may load SystemML R-language package 110 with the library command. R-language source code 210 may be R-language source code stored to R-language source code file 140 as depicted in FIG. 1. SystemML R-language package 110 can take advantage of features of the R language and environment such as the possibility to write new functions, define new classes, and overload existing functions to be used with other data types. In addition, a basic feature of the R language is that not only functions, but also operators and syntactic symbols can be overloaded or overwritten, as they are all defined as functions. SystemML R-language package 110 is an R-language package that includes language interface 120 and runtime interface 130, as described with reference to FIG. 1.

In scenario 200, one or more operations utilize overloaded functions, operators, or specific data types, as designated by language interface 120, such that SystemML R-language package 110 is invoked (designated in FIG. 2 as operation(s) 235). Using the methods described in FIG. 1, language interface 120 will communicate with runtime interface 130 to generate DML scripts (designated in FIG. 2 as DML scripts 240) and in some embodiments, the generated DML scripts may be passed to SystemML 220. In other embodiments, the generated DML scripts may be stored to DML code file 150. In such embodiments, the filename may be passed to SystemML 220, such that SystemML 220 may access the generated DML scripts. As previously mentioned, SystemML 220 is capable of compiling and executing algorithms expressed in declarative machine learning language (DML) in a MapReduce environment. SystemML 220 includes an optimizer capable of creating MapReduce jobs for large-scale cluster execution.

In scenario 200, SystemML 220 may generate MapReduce jobs (designated in FIG. 2 as MapReduce jobs 245) and these MapReduce jobs may be passed to MapReduce 225 for the execution of the MapReduce computation by node computing devices 40A-40N.

In scenario 200, MapReduce 225 is a distributed framework that manages the distribution and replication of files across node computing devices 40A-40N. Once the MapReduce jobs have been executed, some embodiments of HDFS 230 may return results (designated in FIG. 2 as result(s) 255) for analysis in the R-language via SystemML R-language package 110. In other embodiments, SystemML R-language package 110 may access and retrieve MapReduce computation results from HDFS 230. SystemML R-language package 110 may utilize methods discussed in FIG. 1 to convert systemmldata into data types accessible to native R-functions as necessary and return converted results (designated in FIG. 2 as result(s) 260).

Figure 3:
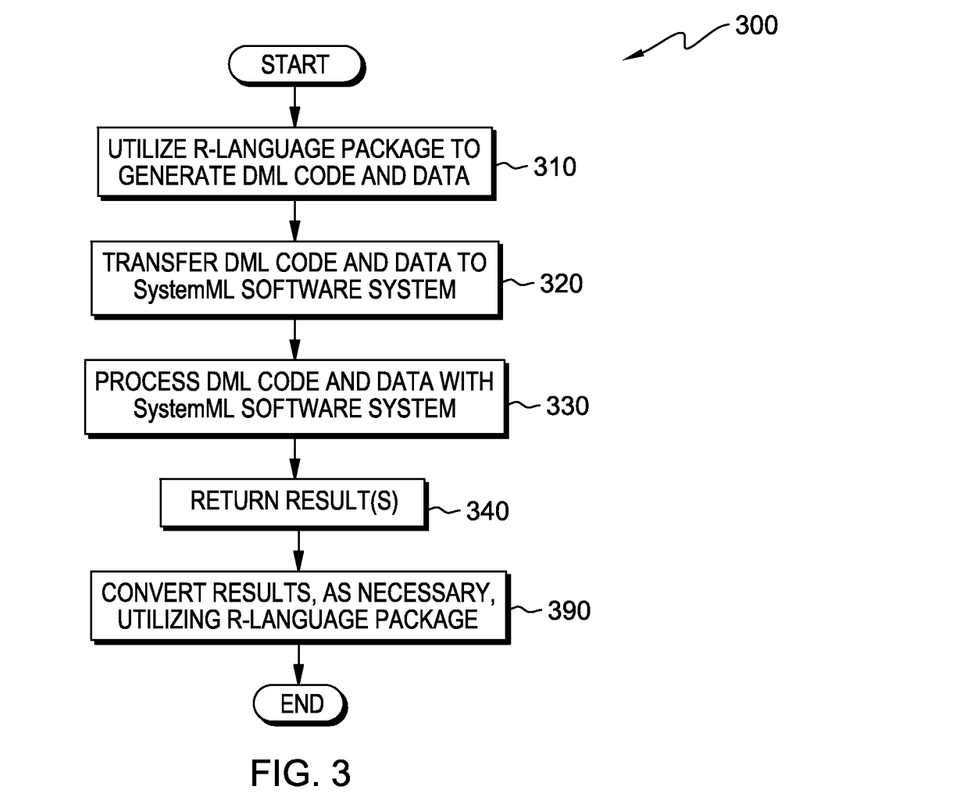
FIG. 3 depicts a flowchart of the steps of a method executing within the system of FIG. 1, for utilizing an R-language package to convert operations and data such that MapReduce operations may be performed, and results returned to the R-language package.

FIG. 3 depicts a flowchart of the steps of a method 300 executing within the computing system of FIG. 1, in accordance with an embodiment of the present invention. Method 300 operates to utilize an R-language package, such as SystemML R-language package 110, to convert operations and data into DML code such that the DML code may be processed by SystemML. In some instances, SystemML may generate MapReduce operations to be performed, and results may be returned and translated such that they may be understood by the R-language.

In one embodiment, initially, a developer may write R-language source code, such as R-language source code 210, which loads an R-language package, such as SystemML R-language package 110. For example, R-language source code 210 may load SystemML R-language package 110 with the library command. R-language source code 210 may include calling functions and creating objects in data types that require the functionality offered by SystemML R-language package 110.

In step 310, method 300 utilizes an R-language package, such as SystemML R-language package 110 to generate DML code and data. SystemML 220 is capable of understanding code written in DML. As previously discussed, source code, such as R-language source code 210 may call functions that initiate utilization of SystemML R-language package 110. SystemML R-language package 110, through the combination of language interface 120 and runtime interface 130 may be capable of translating R-language code and data into DML via the methods discussed with respect to FIG. 1.

In step 320, method 300 transfers the DML code and data to SystemML 220. As previously discussed, SystemML 220 is a software system capable of compiling and executing DML code to generate low-level execution plans for MapReduce. In some embodiments, MapReduce is implemented in Hadoop® and utilizes a HDFS. In some embodiments of method 300, SystemML R-language package 110 streams generated DML code to SystemML 220. In other embodiments, SystemML R-language package 110 stores generated DML code to a file, such as DML code file 150, for access and retrieval by SystemML 220.

In step 330, SystemML 220 processes the DML code and data. SystemML 220 compiles the DML code, utilizing the SystemML compiler, which may include an optimizer. Depending on the data characteristics, one or more MapReduce jobs may be generated by SystemML 220. SystemML 220 may submit the one or more MapReduce jobs for MapReduce computation. In the depicted embodiment, MapReduce computations occur through Hadoop® across a collection of nodes, such as node computing devices 40A-40N. However, alternate MapReduce software environments may be utilized by embodiments of the present invention. MapReduce computations are used to process large data sets and perform large calculations with a parallel, distributed algorithm on a cluster. In the embodiments depicted by FIG. 1 and FIG. 2, HDFS 230 is distributed across a collection of nodes, such as node computing devices 40A-40N.

In some embodiments, after the results of the MapReduce computations have been processed, HDFS 230 may store the result(s) of the MapReduce computations for analysis and/or execution by R, as necessitated by R-language source code 210 (step 340). In other embodiments, SystemML R-language package 110 may access and retrieve computation results from HDFS 230.

In step 390, returned results may be converted or translated into native R-language data types or objects, as necessary based on R-language source code 210. As discussed with reference to FIG. 1, an R-language package, such as SystemML R-language package 110 may functionality provided by language interface 120 and runtime interface 130 to coerce objects and other data types into information accessible to the native functions of the R-language, as is necessary.

Figure 4:
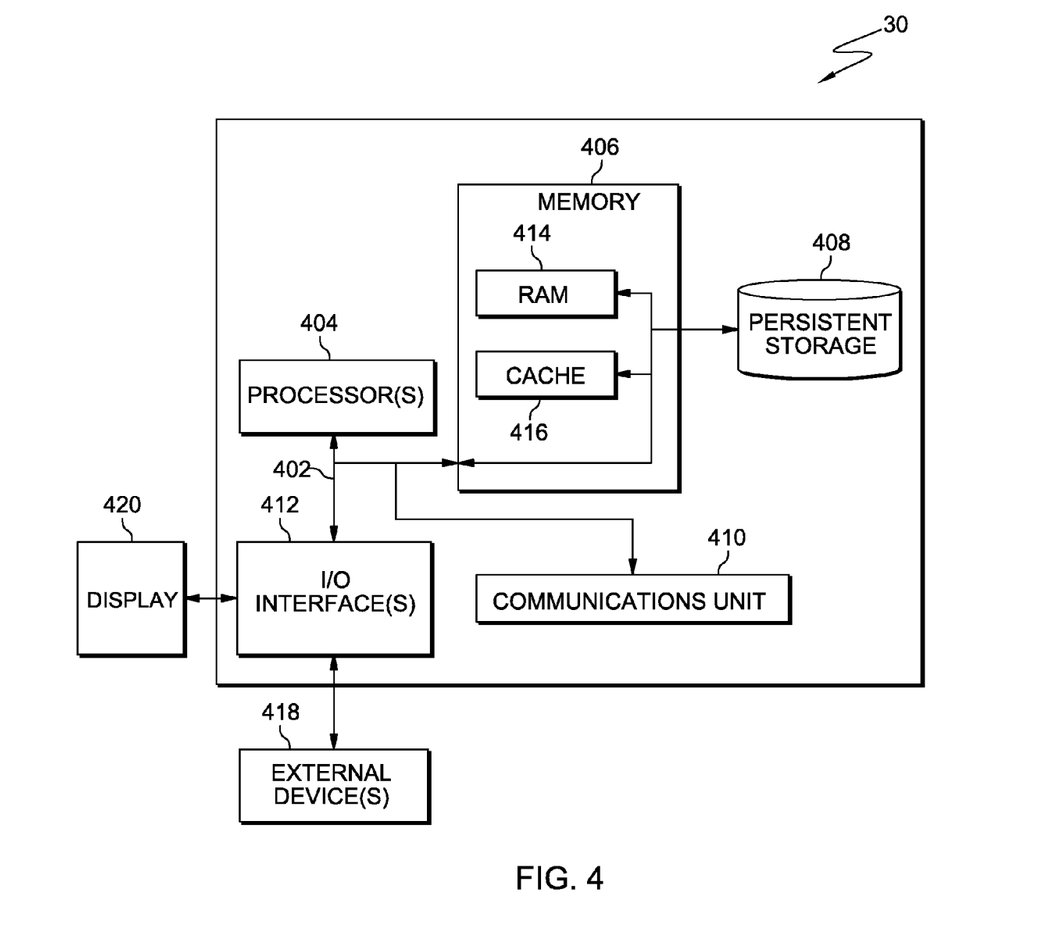
FIG. 4 depicts a block diagram of components of the computing system in accordance with one embodiment of the present invention.

FIG. 4 depicts a block diagram of components of computing system 30 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing system 30 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

SystemML R-language package 110 and R-language source code file 140 is stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. SystemML R-language package 130 may be downloaded to persistent storage 408 through communications unit 410.

I/O interface(s) 412 allows for input and output of data with other devices that may be connected to computing system 30. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., SystemML R-language package 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method to analyze a large data set using a statistical computing environment language operation, the method comprising:
    identifying, by one or more processors, a statistical computing environment language operation corresponding to a class, wherein the class is introduced by a language interface and refers to data intended to be processed by a software system for processing machine learning algorithms in a MapReduce environment;
    generating, by one or more processors, code from the statistical computing environment language operation that can be understood by the software system for processing machine learning algorithms in a MapReduce environment, wherein the statistical computing environment language operation is an R operation and the code is declarative machine learning language;
    transferring the code to the software system for processing machine learning algorithms in a MapReduce environment; and
    invoking execution of the code with the software system for processing machine learning algorithms in a MapReduce environment, wherein invoking the execution of the code with the software system for processing machine learning algorithms in a MapReduce environment comprises the software system for processing machine learning algorithms in a MapReduce environment determining to generate at least one MapReduce job.

2. The method of claim 1, wherein the step of generating the code comprises:
    utilizing a package in a statistical computing environment language which includes the language interface that interprets the statistical computing environment language operation and a runtime interface that communicates with the software system for processing machine learning algorithms in a MapReduce environment.

3. The method of claim 2, wherein the step of invoking the execution of the code further comprises:
    invoking the software system for processing machine learning algorithms in a MapReduce environment to submit the at least one MapReduce job, derived from the code, to a MapReduce environment; and
    receiving, by the package in the statistical computing environment language, a result of the statistical computing environment language operation from the at least one MapReduce job.

4. The method of claim 2, wherein the language interface passes the statistical computing environment language operation to the runtime interface that manages a transfer of data and an execution of the statistical computing environment language operation in the software system for processing machine learning algorithms in a MapReduce environment.

5. The method of claim 2, wherein the language interface passes the statistical computing environment language operation to the runtime interface that manages a transfer of a filename pointer indicating the location of data to the software system for processing machine learning algorithms in a MapReduce environment.

6. The method of claim 4, wherein the language interface passes the statistical computing environment language operation to the runtime interface through at least a use of overloaded functions and overloaded operators.

7. A computer program product comprising:
a computer readable storage medium having program code embodied therewith, the program code is executable by a processor to:
identify a statistical computing environment language operation corresponding to a class, wherein the class is introduced by a language interface and refers to data intended to be processed by a software system for processing machine learning algorithms in a MapReduce environment;
generate code from the statistical computing environment language operation that can be understood by the software system for processing machine learning algorithms in a MapReduce environment, wherein the statistical computing environment language operation is an R operation and the code is declarative machine learning language;
transfer the code to the software system for processing machine learning algorithms in a MapReduce environment; and
invoke execution of the code with the software system for processing machine learning algorithms in a MapReduce environment, wherein invoking the executing of the code with the software system for processing machine learning algorithms in a MapReduce environment comprises the software system for processing machine learning algorithms in a MapReduce environment determining to generate at least one MapReduce job.

8. The computer program product of claim 7, wherein generating the code comprises program code to:
utilize a package in a statistical computing environment language which includes the language interface that interprets the statistical computing environment language operation and a runtime interface that communicates with the software system for processing machine learning algorithms in a MapReduce environment.

9. The computer program product of claim 8, wherein invoking the execution of the code further comprises program code to:
invoke the software system for processing machine learning algorithms in a MapReduce environment to submit the at least one MapReduce job, derived from the code, to a MapReduce environment; and
receive, by the package in the statistical computing environment language, a result of the statistical computing environment language operation from the at least one MapReduce job.

10. The computer program product of claim 8, wherein the language interface passes the statistical computing environment language operation to the runtime interface that manages a transfer of data and an execution of the statistical computing environment language operation in the software system for processing machine learning algorithms in a MapReduce environment.

11. The computer program product of claim 8, wherein the language interface passes the statistical computing environment language operation to the runtime interface that manages a transfer of a filename pointer indicating the location of data to the software system for processing machine learning algorithms in a MapReduce environment.

12. The computer program product of claim 10, wherein the language interface passes the statistical computing environment language operation to the runtime interface through at least a use of overloaded functions and overloaded operators.

13. A system comprising:
a memory having computer readable computer instructions; and
a processor for executing the computer readable instructions, the instructions including:
identify a statistical computing environment language operation corresponding to a class, wherein the class is introduced by a language interface and refers to data intended to be processed by a software system for processing machine learning algorithms in a MapReduce environment;
generate code from a statistical computing environment language operation that can be understood by the software system for processing machine learning algorithms in a MapReduce environment, wherein the statistical computing environment language operation is an R operation and the code is declarative machine learning language;
transfer the code to the software system for processing machine learning algorithms in a MapReduce environment; and
invoke execution of the code with the software system for processing machine learning algorithms in a MapReduce environment, wherein invoking the execution of the code with the software system for processing machine learning algorithms in a MapReduce environment comprises the software system for processing machine learning algorithms in a MapReduce environment determining to generate at least one MapReduce job.

14. The system of claim 13, wherein generating the code comprises program code to:
utilize a package in a statistical computing environment language which includes the language interface that interprets the statistical computing environment language operation and a runtime interface that communicates with the software system for processing machine learning algorithms in a MapReduce environment.

15. The system of claim 14, wherein invoking the execution of the code further comprises program code to:
invoke the software system for processing machine learning algorithms in a MapReduce environment to submit the at least one MapReduce job, derived from the code, to a MapReduce environment; and
receive, by the package in the statistical computing environment language, a result of the statistical computing environment language operation from the at least one MapReduce job.

16. The system of claim 14, wherein the language interface passes the statistical computing environment language operation to the runtime interface that manages a transfer of data and an execution of the statistical computing environment language operation in the software system for processing machine learning algorithms in a MapReduce environment.

17. The system of claim 14, wherein the language interface passes the statistical computing environment language operation to the runtime interface that manages a transfer of a filename pointer indicating the location of data to the software system for processing machine learning algorithms in a MapReduce environment.

\* \* \* \* \*